W. E. BARTLETT.

WHEEL.

No. 11,216.

Reissued Dec. 29, 1891

WITNESSES:

A. M. Jones.

W. L. Adams.

INVENTOR

W. E. Bartlett,

Per Edw. E. Lumby,

Atty.

UNITED STATES PATENT OFFICE.

WILLIAM E. BARTLETT, OF EDINBURGH, SCOTLAND

WHEEL.

SPECIFICATION forming part of Reissued Letters Patent No. 11,216, dated December 29, 1891.

Original No. 448,793, dated March 24, 1891. Application for reissue filed October 22, 1891. Serial No. 409,558.

*To all whom it may concern:*

Be it known that I, WILLIAM ERSKINE BARTLETT, india-rubber manufacturer, a citizen of the United States of America, residing at No. 21 Buckingham Terrace, Edinburgh, Scotland, have invented certain new and useful Wheels, of which the following is a specification.

This invention relates to wheels having an elastic tire or rim. I make the felly of the wheel in the form of a metal trough with its edges inclining inward toward each other. I form the tire out of a short cylinder of india-rubber or like material of about the same diameter as the wheel and longer than the width of the trough and inserted into it, so that it assumes an arched form.

Figure 5:
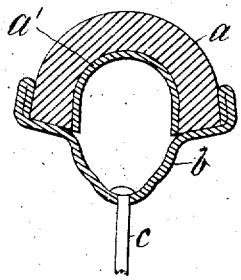
Figure 6:
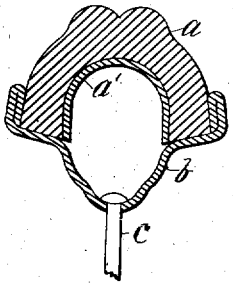
Figure 7:
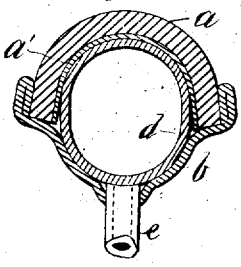
Figure 8:
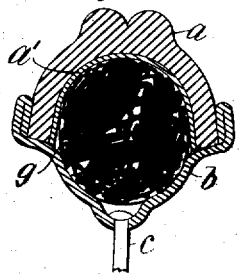

Figures 1 to 4 are local sections of the tires before they are put into place. Figs. 5 and 6 are sections of the rim of the wheel with the tires, Figs. 2 and 4, in place. Figs. 7 and 8 are similar sections of variations.

The tires *a* may be cut from a long cylinder of india-rubber formed on a mandrel of the size of the wheel and vulcanized, a whole series of tires of any desired width being cut from one cylinder; or in place of making the tire of a flat band of vulcanized india-rubber it may be made of a flat band of unvalcanized rubber, which is bent into the forms it assumes when in use, and is then vulcanized so as to make it retain that form.

Figure 1:
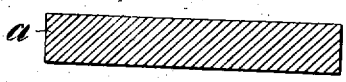
Figure 2:
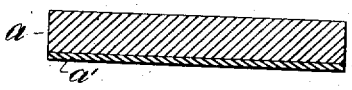
Figure 3:
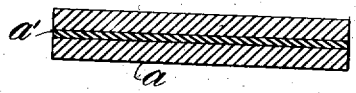
Figure 4:
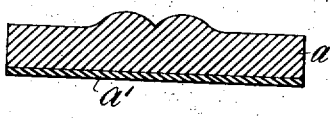

The tire, Fig. 1, is entirely of rubber or like material.

The tires, Figs. 2 to 8, are of rubber strengthened with canvas *a'*; or in place of the strengthening-layers *a'* being of canvas they may be of hard rubber.

The felly *b*, Figs. 5 to 8, is preferably made of sheet-steel rolled to form and bent back on itself. The spokes *c* are wires, as is usual with cycles.

In Fig. 7 the tire *a* has within it a tube *d*, preferably formed of fabric and india-rubber. This tube is filled with air under pressure, (as with the well-known pneumatic tires,) which is supplied through the small branch pipe *e*.

In Fig. 8 the concavities of the felly and tire are filled with a ring *g* of the material known as "india-rubber sponge." In the two latter cases the tire *a* may be made thinner than when unsupported, as in Figs. 5 and 6.

I would state that I lay no claim to the form of felly separately and apart from the tire, nor do I claim the use of sheet india-rubber for the tire separately and apart from the way it is supported and secured; but

What I claim is—

1. A wheel having a vulcanized india-rubber tire of cylindrical form when free and without joint after vulcanization and held upon the wheel in a form trough-like in section and there retained by inwardly-inclined flanges upon the wheel.

2. A wheel having a rim formed with inwardly-inclined flanges, and a vulcanized india-rubber tire without joint formed from a cylinder of rubber bent and held upon the wheel in a trough-like form.

3. A wheel whose felly is of a trough-like section, the sides of the trough inclining toward each other and whose tire consists of a cylinder of india-rubber or other elastic material of greater length than the width of the trough, so that when in place it assumes an arched form, the two ends of the cylinder abutting against the bottom of the trough, while the ends of the sides of the cylinder abut against the inclined sides of the trough.

4. A wheel-rim provided with outwardly-convergent side flanges, an annular inflatable tube seated in said wheel-rim, and a rubber tire of arched form in cross-section and embracing the convex portion of said annular tube and having its edges inclosed between said flanges and the opposite sides of said annular tube, respectively, substantially as shown and described.

WM. E. BARTLETT.

Witnesses:
A. M. JONES,
M. L. ADAMS.